(12) United States Patent
Kanai et al.

(10) Patent No.: US 12,536,301 B2
(45) Date of Patent: Jan. 27, 2026

(54) INFORMATION PROCESSING DEVICE, INFORMATION PROCESSING SYSTEM, INFORMATION PROCESSING METHOD, AND COMPUTER PROGRAM PRODUCT

(71) Applicant: KABUSHIKI KAISHA TOSHIBA, Tokyo (JP)

(72) Inventors: Jun Kanai, Tokyo (JP); Tatsuya Uehara, Kawasaki Kanagawa (JP); Ryuiti Koike, Kawasaki Kanagawa (JP); Hayeong Shin, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 229 days.

(21) Appl. No.: 18/456,132

(22) Filed: Aug. 25, 2023

(65) Prior Publication Data

US 2024/0273216 A1  Aug. 15, 2024

(30) Foreign Application Priority Data

Feb. 15, 2023   (JP) ................................ 2023-021570

(51) Int. Cl.
*G06F 21/57*   (2013.01)
(52) U.S. Cl.
CPC ...... *G06F 21/577* (2013.01); *G06F 2221/034* (2013.01)
(58) Field of Classification Search
None
See application file for complete search history.

(56) References Cited

U.S. PATENT DOCUMENTS

| 9,692,778 | B1 * | 6/2017 | Mohanty | ............. G06F 9/45533 |
| 2013/0074188 | A1 * | 3/2013 | Giakouminakis | ..... G06F 21/577 726/25 |

(Continued)

FOREIGN PATENT DOCUMENTS

| JP | 2007-58514 A | 3/2007 |
| JP | 2009-110177 A | 5/2009 |

(Continued)

OTHER PUBLICATIONS

Japan Patent Office, Office Action in JP App. No. 2023-021570 (Jul. 15, 2025).

*Primary Examiner* — Kaveh Abrishamkar
(74) *Attorney, Agent, or Firm* — Finnegan, Henderson, Farabow, Garrett & Dunner, LLP

(57) ABSTRACT

An information processing device according to an embodiment includes a risky vulnerability detection unit, a technical similarity calculation unit, a risk score calculation unit, and an output unit. The risky vulnerability detection unit detects, as a risky vulnerability, a vulnerability having the possibility of being attacked for an object system executing information processing. For each vulnerability registered in advance, the technical similarity calculation unit calculates a technical similarity representing a technical similarity to the risky vulnerability. For each vulnerability, the risk score calculation unit calculates a risk score representing the level of the risk of attack on each vulnerability in the object system, based on the technical similarity. The output unit determines at least one of the vulnerabilities as a target vulnerability to be dealt with, based on the risk score for each vulnerability, and outputs identification information for identifying the target vulnerability.

16 Claims, 10 Drawing Sheets

(56) References Cited

U.S. PATENT DOCUMENTS

| | | | | |
|---|---|---|---|---|
| 2016/0119373 A1* | 4/2016 | Fausto | ................ | H04L 63/1433 |
| | | | | 726/25 |
| 2016/0140344 A1 | 5/2016 | Sato et al. | | |
| 2016/0232358 A1* | 8/2016 | Grieco | ................. | G06F 21/577 |
| 2018/0225460 A1 | 8/2018 | Nakajima et al. | | |
| 2020/0012796 A1* | 1/2020 | Trepagnier | ............ | G06F 18/254 |
| 2021/0044612 A1 | 2/2021 | Kawauchi et al. | | |
| 2021/0173940 A1* | 6/2021 | Mylrea | ................ | G06F 16/953 |
| 2022/0286474 A1* | 9/2022 | Kuppa | ................. | H04L 63/145 |
| 2022/0311786 A1 | 9/2022 | Ueda et al. | | |

FOREIGN PATENT DOCUMENTS

| | | |
|---|---|---|
| JP | 6042541 B2 | 12/2016 |
| JP | 6518613 B2 | 5/2019 |
| JP | 2020-173491 A | 10/2020 |
| JP | 6968722 B2 | 11/2021 |
| WO | WO 2017/061270 A1 | 4/2017 |
| WO | WO 2019/138542 A1 | 7/2019 |
| WO | WO 2021/059518 A1 | 4/2021 |

\* cited by examiner

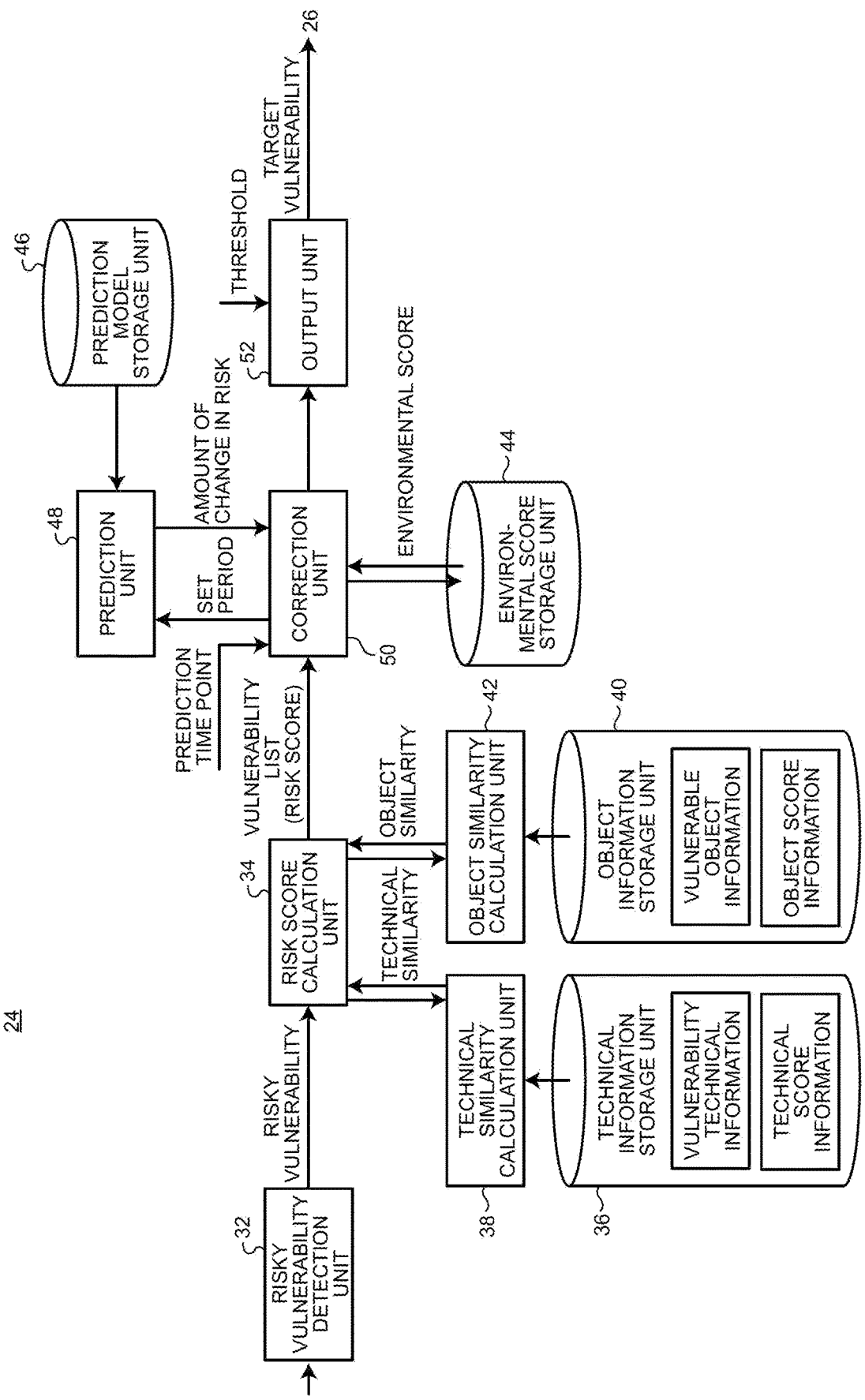

FIG.3

| VULNERABILITY IDENTIFICATION INFORMATION (CVE) | VULNERABILITY TECHNICAL INFORMATION | | |
|---|---|---|---|
| | VULNERABILITY TYPE (CWE) | VULNERABILITY CHARACTERISTIC (CVSS VECTOR) | FEATURE (VULNERABILITY CODE FEATURE) |
| CVE-2019-xxxxx | CWE-XXX | VECTOR B | CCCCC |
| CVE-2019-yyyyy | CWE-ZZZ | VECTOR C | DDDDD |
| CVE-2019-zzzzz | CWE-XXX | VECTOR A | AAAAA |
| CVE-2020-xxxxx | CWE-XXX | VECTOR A | BBBBB |
| CVE-2020-yyyyy | CWE-ZZZ | VECTOR C | EEEEE |
| CVE-2020-zzzzz | CWE-YYY | VECTOR B | FFFFF |
| CVE-2021-xxxxx | CWE-ZZZ | VECTOR A | GGGG |
| CVE-2021-yyyyy | CWE-XXX | VECTOR A | AAAAA |

FIG.4

| ITEM | SCORE |
|---|---|
| IDENTICAL IN VULNERABILITY TYPE (CWE) | 2 |
| IDENTICAL IN VULNERABILITY CHARACTERISTIC (CVSS VECTOR) | 1 |
| IDENTICAL IN FEATURE (VULNERABILITY CODE FEATURE) | 3 |

FIG.5

| IDENTIFICATION INFORMATION (CVE) | VULNERABLE OBJECT INFORMATION | | |
| --- | --- | --- | --- |
| | OBJECT SOFT-WARE/HARDWARE | SOFTWARE TYPE | OBJECT HARDWARE TYPE |
| CVE-2019-xxxxx | WebSrvBar | WEB SERVER | ALL TYPES |
| CVE-2019-yyyyy | PROCESSOR A | - | PROCESSOR A |
| CVE-2019-zzzzz | LibFoo | LIBRARY | PROCESSOR A |
| CVE-2020-xxxxx | WebSrvBar | WEB SERVER | PROCESSOR B |
| CVE-2020-yyyyy | PROCESSOR B | - | PROCESSOR B |
| CVE-2020-zzzzz | WebSrvFoo | WEB SERVER | PROCESSOR B |
| CVE-2021-xxxxx | PROCESSOR A | - | PROCESSOR A |
| CVE-2021-yyyyy | WebSrvFoo | WEB SERVER | PROCESSOR A |

FIG.6

| ITEM | SCORE |
| --- | --- |
| IDENTICAL IN SOFTWARE/HARDWARE | 3 |
| IDENTICAL IN SOFTWARE TYPE | 1 |
| IDENTICAL IN OBJECT HARDWARE TYPE | 1 |

FIG.7

| VULNERABILITY IDENTIFICATION INFORMATION (CVE) | FIRST SYSTEM CVSS ENVIRONMENTAL SCORE | SECOND SYSTEM CVSS ENVIRONMENTAL SCORE |
|---|---|---|
| CVE-2019-xxxxx | 9.5 | 5.8 |
| CVE-2019-yyyyy | 2.3 | 2.3 |
| CVE-2019-zzzzz | 8.8 | 8.3 |
| CVE-2020-xxxxx | 7.2 | 6.2 |
| CVE-2020-yyyyy | 1.2 | 1.3 |
| CVE-2020-zzzzz | 8.0 | 7.0 |
| CVE-2021-xxxxx | 5.6 | 5.4 |
| CVE-2021-yyyyy | 7.3 | 6.3 |

FIG.10

| MITIGATION MEASURE | EFFECTIVE VULNERABILITY IDENTIFICATION INFORMATION (EFFECTIVE CVE) | EFFECTIVE VULNERABILITY TYPE (EFFECTIVE CWE) | EFFECTIVE VULNERABILITY CHARACTERISTIC (EFFECTIVE CVSS VECTOR) | EFFECTIVE FEATURE (EFFECTIVE VULNERABILITY CODE FEATURE) |
|---|---|---|---|---|
| Firewall | - | CWE-ZZZ | VECTOR B | - |
| IDS | CVE-2019-xxxxx, CVE-2019-zzzzz | - | - | - |
| ANTI-VIRUS COMPUTER PROGRAM | - | CWE-YYY | - | - |

INFORMATION PROCESSING DEVICE, INFORMATION PROCESSING SYSTEM, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2023-021570, filed on Feb. 15, 2023; the entire contents of which are incorporated herein by reference.

FIELD

Embodiments herein relate generally to an information processing device, an information processing system, an information processing method, and a computer program product.

BACKGROUND

Security vulnerabilities have been reported on a daily basis. It is desirable to deal with the reported vulnerabilities immediately. However, there are some systems that allows not all the reported vulnerabilities to be immediately dealt with. For example, the timing for the maintenance of operational technology (OT) systems for factories, plants, and social infrastructures such as transportation, electricity, and water supply is limited, and therefore, not all the reported vulnerabilities can be immediately dealt with.

In the OT systems, there is a demand to deal with vulnerabilities by applying only the minimum patch programs in order to avoid a great influence on a system in operation. For example, a technique has been known for which, using a method of heightening the priority to dealing with a vulnerability matching a specific keyword, a vulnerability to be dealt with is efficiently selected from a large number of reported vulnerabilities.

However, there is a possibility that, when only the minimum patch programs are applied, only a high-risk (risky) vulnerability at a specific time point is dealt with, meanwhile other vulnerabilities similar to the high-risk vulnerability are not be dealt with. For example, in the case of the method of heightening the priority to dealing with a vulnerability matching a specific keyword, the user needs to determine a keyword for other vulnerabilities similar to the high-risk vulnerability, and hence it becomes difficult to deal with the other vulnerabilities. As such, when the other vulnerabilities similar to the high-risk vulnerability are attacked, measures need to be taken again, and as a result, a system cannot be efficiently operated.

BRIEF DESCRIPTION OF THE DRAWINGS

FIG. 2 is a diagram illustrating the configuration of a selection device according to the first embodiment;

FIG. 3 is a diagram illustrating an example of vulnerability technical information;

FIG. 4 is a diagram illustrating an example of technical score information;

FIG. 5 is a diagram illustrating an example of vulnerable object information;

FIG. 6 is a diagram illustrating an example of object score information;

FIG. 7 is a diagram illustrating an example of environmental scores;

FIG. 10 is a diagram illustrating an example of mitigation measure information;

DETAILED DESCRIPTION

An information processing device according to an embodiment includes one or more hardware processors configured to function as a risky vulnerability detection unit, a technical similarity calculation unit, a risk score calculation unit, and an output unit. The risky vulnerability detection unit is configured to detect, as a risky vulnerability, a vulnerability having a possibility of becoming a cause of attack on an object system configured to execute information processing. The technical similarity calculation unit is configured to calculate a technical similarity representing a technical similarity to the risky vulnerability, for each of a plurality of vulnerabilities registered in advance. The risk score calculation unit is configured to calculate, for each of the vulnerabilities, a risk score representing a level of a risk of attack on a corresponding vulnerability in the object system, based on the technical similarity. The output unit is configured to determine at least one of the vulnerabilities as a target vulnerability to be dealt with, based on the risk score for each of the vulnerabilities, and output identification information for identifying the target vulnerability. Hereinafter, embodiments according to the present invention will be described with reference to the drawings.

First Embodiment

Figure 1:
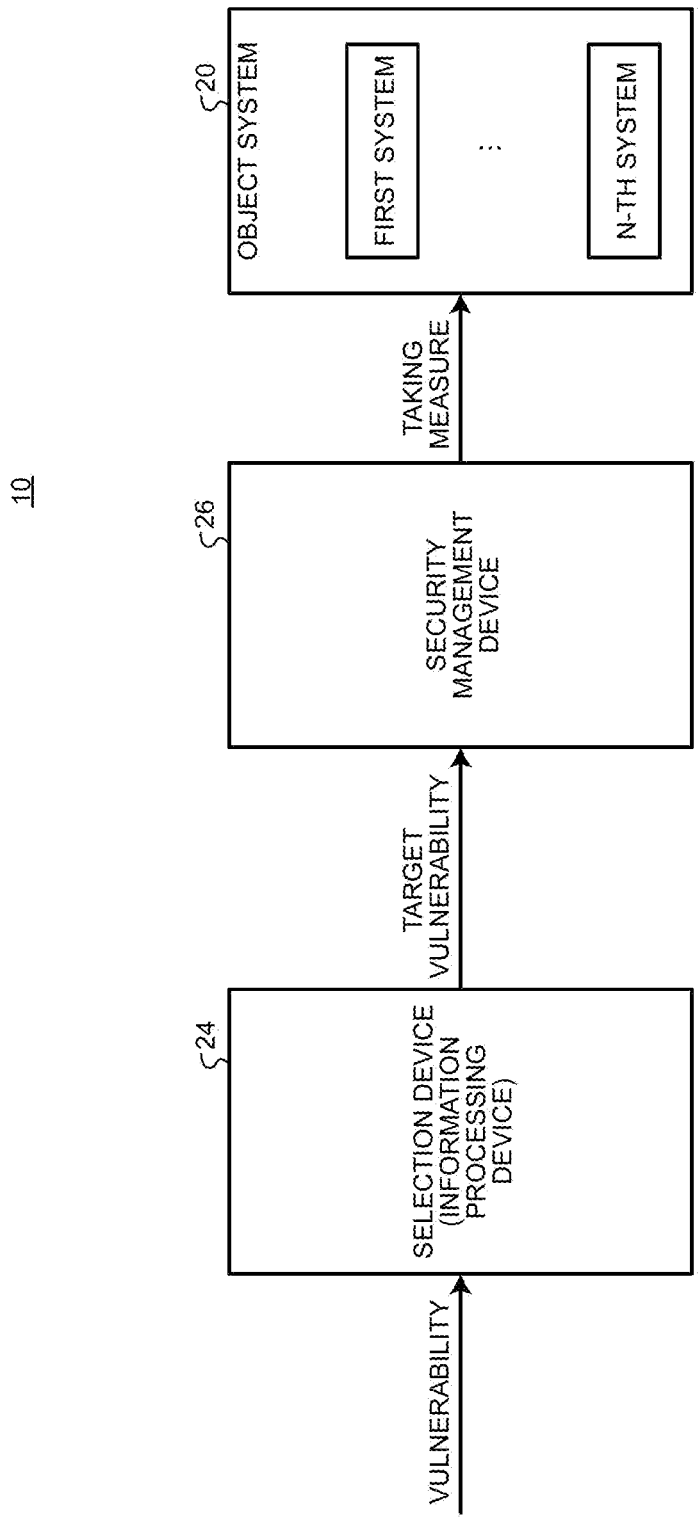
FIG. 1 is a diagram illustrating the configuration of an information processing system according to a first embodiment.

FIG. 1 is a diagram illustrating the configuration of an information processing system 10 according to a first embodiment.

When detecting a risky vulnerability with a high degree of risk, the information processing system 10 efficiently selects a target vulnerability that is similar to the risky vulnerability and needs to be dealt with. Subsequently, the information processing system 10 takes a measure to apply a patch program to the target vulnerability. Thus, the information processing system 10 can take the measure in advance against other vulnerabilities similar to the risky vulnerability, which results in more efficient system operation.

The information processing system 10 includes an object system 20, a selection device 24, and a security management device 26.

The object system 20 is a computer system configured to execute information processing. The object system 20 is, for example, an OT system configured to execute information processing for factories, plants, and social infrastructure such as transportation, electricity, and water supply. The object system 20 may be an information technology (IT) system. The object system 20 may, for example, include a plurality of systems (for example, a first system, a second system, . . . , a Nth system). Each of the systems may independently apply a patch program and take a mitigation measure against vulnerabilities.

The selection device 24 is implemented by an information processing device such as a computer.

For example, the selection device 24 acquires information on vulnerabilities from a server device configured to provide information on security. The selection device 24 detects a vulnerability having the possibility of becoming the cause of attack on the object system 20 as a risky vulnerability and selects other vulnerabilities similar to the detected risky vulnerability as a target vulnerability to be dealt with.

For the object system 20, the security management device 26 takes a measure against a vulnerability (risky vulnerability) having the possibility of becoming the cause of attack on the object system 20. At the same time, for the object system 20, the security management device 26 takes a measure against the target vulnerability selected by the selection device 24.

A vulnerability described herein means a security defect in an operating system or an application program executed by a computer, the security defect being caused by a failure, an error, or the like in a computer program code. The vulnerability further includes a security defect present in a hardware processor or a processing circuit similar to the hardware processor. When a vulnerability is left as it is, a computer system may be made use of for infection of a virus, worm, or the like or made use of for unauthorized access. That is, in a computer system, a vulnerability left as it is becomes a target for attack.

Examples of a measure to prevent vulnerabilities include a method of updating an operating system and an application program to a new computer program in which vulnerabilities are eliminated, and a method of applying a patch program such as an additional computer program or an update program to eliminate vulnerabilities. Furthermore, examples of the measure to prevent vulnerabilities include a method of taking a mitigation measure, such as installation of a firewall, installation of an intrusion detection system (IDS), or introduction of an anti-virus program.

In the first embodiment, the security management device 26 takes a measure against a target vulnerability by providing the object system 20 with a patch program for the target vulnerability and causing the object system 20 to execute the patch program. Note that, in the information processing system 10, the user may take the measure against the target vulnerability, in place of the security management device 26. That is, in the information processing system 10, the user may provide the object system 20 with a patch program for the target vulnerability selected by the selection device 24, and thereby cause the object system 20 to execute the patch program.

FIG. 2 is a diagram illustrating the configuration of the selection device 24 according to the first embodiment.

The selection device 24 includes a risky vulnerability detection unit 32, a risk score calculation unit 34, a technical information storage unit 36, a technical similarity calculation unit 38, an object information storage unit 40, an object similarity calculation unit 42, an environmental score storage unit 44, a prediction model storage unit 46, a prediction unit 48, a correction unit 50, and an output unit 52.

The risky vulnerability detection unit 32 acquires information on vulnerabilities from a server device or the like configured to provide information on security. Based on the acquired information on the vulnerabilities, the risky vulnerability detection unit 32 detects a vulnerability having the possibility of becoming the cause of attack on the object system 20, as a risky vulnerability. The risky vulnerability detection unit 32 provides information for identifying the risky vulnerability to the risk score calculation unit 34.

For example, the risky vulnerability detection unit 32 determines whether or not to detect the acquired vulnerability as a risky vulnerability by using a common vulnerability scoring system (CVSS) basic value, a CVSS environmental score, and the like that are calculated, based on CVSS evaluation criteria. The risky vulnerability detection unit 32 may also determine whether or not to detect the acquired vulnerability as a risky vulnerability by using, for example, an index based on an exploit prediction scoring system (EPSS) or the like, information indicating whether or not the vulnerability has been actually made use of for attack, and the presence or absence of an exploit code serving as a computer program code produced to duplicate an unauthorized operation that abuses the vulnerability.

When acquiring information for identifying a risky vulnerability, the risk score calculation unit 34 provides the acquired information for identifying the risky vulnerability to the technical similarity calculation unit 38 and the object similarity calculation unit 42. For each of a plurality of vulnerabilities registered in advance, the risk score calculation unit 34 acquires a technical similarity indicating a technical similarity to the risky vulnerability from the technical similarity calculation unit 38. Furthermore, for each of the vulnerabilities registered in advance, the risk score calculation unit 34 acquires an object similarity indicating a similarity of an object that is software or hardware having or causing a vulnerability to the risky vulnerability.

Each of the vulnerabilities registered in advance is, for example, a vulnerability having been already found, analyzed, and registered. The vulnerabilities registered in advance may not include a vulnerability on which a measure has been already taken in the object system 20.

For each of the vulnerabilities registered in advance, the risk score calculation unit 34 calculates a risk score indicating the level of the risk of attack on the corresponding vulnerability in the object system 20, based on the acquired technical similarity and the acquired object similarity. Subsequently, the risk score calculation unit 34 produces a vulnerability list that is a list of information indicating a pair of information for identifying the vulnerability and a risk score for (of) each of the vulnerabilities, and provides the produced vulnerability list to the correction unit 50. Note that an example of a method for calculating a risk score will be described in detail with reference to S15 in FIG. 8.

The technical information storage unit 36 stores vulnerability technical information and technical score information. The vulnerability technical information includes information on technical features of the vulnerabilities registered in advance. The vulnerability technical information includes technical features for each of a plurality of items classified into categories. Note that an example of the vulnerability technical information will be described in detail later with reference to FIG. 3.

The technical score information includes scores each assigned to a corresponding one of the items indicated by the vulnerability technical information. The scores are used for calculating a technical similarity between each of the vulnerabilities registered in advance and the risky vulnerability. A greater score is assigned to an item having a greater influence on the technical similarity. Note that an example of the technical score information will be described in detail later with reference to FIG. 4.

The technical similarity calculation unit 38 acquires information for identifying a risky vulnerability from the risk score calculation unit 34. When acquiring the information for identifying the risky vulnerability, the technical similarity calculation unit 38 refers to the vulnerability technical information and the technical score information stored in the technical information storage unit 36 and thereby calculates a technical similarity for each of the vulnerabilities registered in advance. The technical similarity calculation unit 38 provides the calculated technical similarity to the risk score calculation unit 34. Note that an example of a method for calculating the technical similarity will be described in detail later with reference to FIG. 4.

The object information storage unit 40 stores vulnerable object information and object score information. For each of the vulnerabilities registered in advance, the vulnerable object information includes information indicating an object that is software or hardware having or causing a vulnerability. The vulnerable object information includes an object for each of the items classified into categories. Note that an example of the vulnerable object information will be described in detail later with reference to FIG. 5.

The object score information includes scores each assigned to a corresponding one of the items indicated by the vulnerable object information. The scores are used for calculating an object similarity between each of the vulnerabilities registered in advance and the risky vulnerability. A greater influence on the object similarity results in a greater score. Note that an example of the object score information will be described in detail later with reference to FIG. 6.

The object similarity calculation unit 42 acquires information for identifying a risky vulnerability from the risk score calculation unit 34. When acquiring the information for identifying the risky vulnerability, the object similarity calculation unit 42 refers to the vulnerable object information and the object score information stored in the object information storage unit 40 and thereby calculates an object similarity for each of the vulnerabilities registered in advance. The object similarity calculation unit 42 provides the calculated object similarity to the risk score calculation unit 34. Note that an example of a method for calculating the object similarity will be described in detail later with reference to FIG. 6.

For each of the vulnerabilities, the environmental score storage unit 44 stores an environmental score as a parameter indicating the level of influence when the object system 20 is attacked. In the case where the object system 20 includes a plurality of systems (a first system, a second system, . . . , a Nth system), the environmental score storage unit 44 stores an environmental score for each of the systems and for each of the vulnerabilities. For example, the environmental score is a CVSS environmental score calculated based on the CVSS evaluation criteria. The environmental score may be a score calculated based on evaluation criteria other than the CVSS. Note that an example of the environmental score will be described in detail later with reference to FIG. 7.

The prediction model storage unit 46 stores a prediction model for acquiring time-series changes in the risk of attack on a vulnerability from a specific time point to any prediction time point. For example, the prediction model is a model configured such that, by inputting a set period from a date at a specific time point to a date at a prediction time point when the risk of attack on a vulnerability is desired to be predicted, the amount of change in the risk from the specific time point to the prediction time point is outputted. The prediction model is, for example, a machine-learning model trained by using data on changes of the risk in the past as training data. The prediction model may also be, for example, a function, an arithmetic formula, or a computer program.

The prediction unit 48 acquires a set period from the correction unit 50. When acquiring the set period, the prediction unit 48 reads the prediction model from the prediction model storage unit 46 and inputs the set period into the read prediction model to calculate the amount of change in the risk. Subsequently, the prediction unit 48 provides the calculated amount of change in the risk to the correction unit 50. The prediction model storage unit 46 and the prediction unit 48 may be implemented by a server or the like external to the selection device 24.

The correction unit 50 acquires the vulnerability list from the risk score calculation unit 34. When acquiring the vulnerability list, the correction unit 50 reads an environmental score on the object system 20 for each of the vulnerabilities from the environmental score storage unit 44. When the object system 20 includes a plurality of systems, the correction unit 50 acquires an environmental score on each of the systems for each of the vulnerabilities from the environmental score storage unit 44.

Furthermore, when acquiring the vulnerability list, the correction unit 50 acquires a prediction time point. The correction unit 50 calculates a period from a specific time point to the prediction time point as a set period. The correction unit 50 provides the calculated set period to the prediction unit 48, and acquires, from the prediction unit 48, the amount of change in the risk of attack on a vulnerability for a lapse of the set period.

The specific time point may be the present time point. Alternatively, the specific time point may be a last update time point of the vulnerability technical information and the vulnerable object information.

The prediction time point may be inputted by the user. For example, the prediction time point is a point in time when the next maintenance for providing a patch program to the object system 20 is performed. In the case where the prediction time point is the point in time when the next maintenance is performed, the correction unit 50 can calculate a risk score at the point in time when the next maintenance is performed.

Subsequently, the correction unit 50 corrects the risk score for each of the vulnerabilities contained in the vulnerability list, based on the acquired environmental score and the acquired amount of change in the risk. In the case where the object system 20 includes a plurality of systems, the correction unit 50 corrects the risk score for each of the systems from the environmental score storage unit 44, for each of the vulnerabilities. Subsequently, the correction unit 50 provides the output unit 52 with the vulnerability list obtained after the risk score correction. Note that an example of a method for correcting a risk score will be described with reference to S19 in FIG. 8.

The output unit 52 acquires the vulnerability list containing the corrected risk scores from the correction unit 50. When acquiring the vulnerability list, the output unit 52 determines at least one of the vulnerabilities as a target vulnerability to be dealt with, based on risk scores for the vulnerabilities contained in the vulnerability list. The output unit 52 sets a threshold in advance, for example. Out of the vulnerabilities, the output unit 52 determines a vulnerability having a risk score equal to or greater than the preset threshold, as the target vulnerability. In the case where the object system 20 includes a plurality of systems, the output unit 52 determines the target vulnerability for each of the systems.

Subsequently, the output unit 52 outputs identification information for identifying the target vulnerability to the security management device 26. The output unit 52 may output a risk score of the target vulnerability along with the identification information for identifying the target vulnerability. Alternatively, the output unit 52 may display the identification information for identifying the target vulnerability and the risk score on a display device to present the identification information and the risk score to the user.

FIG. 3 is a diagram illustrating an example of vulnerability technical information stored in the technical information storage unit 36. The vulnerability technical information includes, as an example, technical features on each of the items so as to correspond to the identification information for identifying vulnerabilities.

The identification information for identifying vulnerabilities is, for example, a common vulnerabilities and exposures (CVE) identifier. The CVE identifier is represented by a combination of letters, symbols, and numbers defined by a non-profit organization, Mitre Corporation.

Each of the items represents a technical feature category. Examples of the items include the type of a vulnerability, the characteristic of the vulnerability, and the feature (feature amount) of the source or binary code of the vulnerability.

Examples of the type of the vulnerability include common weakness enumeration (CWE). The CWE is information for classifying and identifying vulnerabilities, the information being issued by Mitre Corporation.

Examples of the characteristic of the vulnerability include a CVSS vector. The CVSS vector is textual information on an evaluation reference score used for score determination.

Examples of the feature of the source or binary code of the vulnerability include a vulnerability code feature. The vulnerability code feature is a characteristic part in the source or binary code of a vulnerability.

FIG. 4 is a diagram illustrating an example of technical score information stored in the technical information storage unit 36.

The technical score information includes scores each assigned in advance to a corresponding one of the items indicated by the vulnerability technical information. For example, the technical score information includes scores each assigned in advance to a corresponding one of the type of a vulnerability (such as CWE), the characteristic of the vulnerability (such as a CVSS vector), and the feature of the source or binary code of the vulnerability (such as a vulnerability code feature). The scores are assigned by an administrator or the like.

As an item has a greater influence on a technical similarity between a vulnerability and another vulnerability, a score indicated in the technical score information is greater. In the example in FIG. 4, when two vulnerabilities are identical in the feature of the source or binary code thereof, a score of 3 is assigned because technical similarity is the greatest. Furthermore, in the example in FIG. 4, when two vulnerabilities are identical in the characteristic thereof, a score of 1 is assigned because technical similarity is relatively small. Furthermore, in the example in FIG. 4, when two vulnerabilities are identical in the type thereof, a score of 2 is assigned because technical similarity is at a medium level.

When acquiring information for identifying a risky vulnerability, the technical similarity calculation unit 38 refers to such vulnerability technical information and technical score information and calculates a technical similarity for each of the vulnerabilities registered in advance. The technical similarity calculation unit 38 provides the calculated technical similarity to the risk score calculation unit 34.

For example, when acquiring information for identifying a risky vulnerability, the technical similarity calculation unit 38 calculates a technical similarity for each of a plurality of vulnerabilities (CVE-2019-xxxxx to CVE-2021-yyyyy), except a risky vulnerability, illustrated in FIG. 3.

For example, for each of the vulnerabilities, the technical similarity calculation unit 38 calculates, as a technical similarity, a value obtained by adding scores of items identical to the risky vulnerability.

For example, it is assumed that the technical similarity calculation unit 38 acquires a vulnerability with identification information CVE-2021-yyyyy as a risky vulnerability. In this case, the vulnerability with identification information CVE-2019-xxxxx and the acquired risky vulnerability (CVE-2021-yyyyy) are identical in the type of a vulnerability (CWE), but are not identical in the characteristic of the vulnerability (CVSS vector) and the feature of the vulnerability (vulnerability code feature). Therefore, the technical similarity calculation unit 38 calculates a technical similarity of the vulnerability with identification information CVE-2019-xxxxx to the risky vulnerability (CVE-2021-yyyyy) as a score of 2+0+0=2.

In this case, the vulnerability with identification information CVE-2019-zzzzz and the acquired risky vulnerability (CVE-2021-yyyyy) are identical in all of the type of a vulnerability (CWE), the characteristic of the vulnerability (CVSS vector), and the feature of the vulnerability (vulnerability code feature). Therefore, the technical similarity calculation unit 38 calculates a technical similarity of a vulnerability with identification information CVE-2019-zzzzz to the risky vulnerability (CVE-2021-yyyyy) as a score of 2+1+3=6.

FIG. 5 is a diagram illustrating an example of vulnerable object information stored in the object information storage unit 40. The vulnerable object information includes, as an example, an object related to each of a plurality of items so as to correspond to the identification information for identifying a vulnerability.

Each of the items represents an object category. Examples of the items include object software/hardware, a software type, and an object hardware type.

The object software/hardware is, for example, software or hardware having a vulnerability.

When software has a vulnerability, the software type denotes the type of software having a vulnerability. Note that, when hardware has a vulnerability, the space for software type in the table in the figure is left blank without any description.

When software has a vulnerability, the object hardware type denotes the type of hardware that executes software having a vulnerability. Note that, when software having a vulnerability is executed by not only a specific type of hardware but also all types of hardware, the object hardware type denotes all types of hardware. When hardware has a vulnerability, the object hardware type denotes hardware having a vulnerability.

FIG. 6 is a diagram illustrating an example of object score information stored in the object information storage unit 40.

The object score information includes scores each assigned in advance to a corresponding one of the items indicated in the vulnerable object information. For example, the object score information includes scores each assigned in advance to a corresponding one of object software/hardware, a software type, and an object hardware type. The scores are assigned by an administrator or the like.

As an item has a greater influence on an object similarity between a vulnerability and another vulnerability, a score indicated in the object score information is greater. In the example in FIG. 6, when two vulnerabilities are identical in object software/hardware, a score of 3 is assigned because the degree of object similarity is the highest. In the example in FIG. 6, when two vulnerabilities are identical in software type, a score of 1 is assigned because an object similarity is relatively small. In the example in FIG. 6, when two vulnerabilities are identical in object hardware type, a score of 1 is assigned because an object similarity is relatively small.

When acquiring information for identifying a risky vulnerability, the object similarity calculation unit 42 refers to such vulnerable object information and object score information and thereby calculates an object similarity for each of the vulnerabilities registered in advance. The object similarity calculation unit 42 provides the calculated object similarity to the risk score calculation unit 34.

For example, when acquiring information for identifying a risky vulnerability, the object similarity calculation unit 42 calculates an object similarity for each of the vulnerabilities (CVE-2019-xxxxx to CVE-2021-yyyyy) with vulnerability identification information illustrated in FIG. 5.

Specifically, for each of the vulnerabilities, the object similarity calculation unit 42 calculates, as an object similarity, a value obtained by adding scores of items identical to a risky vulnerability.

For example, it is assumed that the object similarity calculation unit 42 acquires a vulnerability with identification information CVE-2021-yyyyy as a risky vulnerability. In this case, a vulnerability with identification information CVE-2019-xxxxx and the acquired risky vulnerability (CVE-2021-yyyyy) are identical in the object hardware type and software type, but are not identical in object software/hardware. Note that, in the case of CVE-2019-xxxxx, the object hardware type covers all types of hardware including Processor A, and hence, the object similarity calculation unit 42 determines that the vulnerability CVE-2019-xxxxx and the risky vulnerability (CVE-2021-yyyyy) are identical in object hardware type. Therefore, the object similarity calculation unit 42 calculates an object similarity of the vulnerability with identification information CVE-2019-xxxxx to the risky vulnerability (CVE-2021-yyyyy) as a score of 0+1+1=2.

Furthermore, in this case, the vulnerability with identification information CVE-2019-zzzzz and the acquired risky vulnerability (CVE-2021-yyyyy) are identical in object hardware type, and are not identical in object software/hardware and software type. Therefore, the object similarity calculation unit 42 calculates an object similarity of the vulnerability with identification information CVE-2019-zzzzz to the risky vulnerability (CVE-2021-yyyyy) as a score of 0+1+0=1.

FIG. 7 is a diagram illustrating an example of environmental scores stored in the environmental score storage unit 44. For each of the vulnerabilities registered in advance, the environmental score storage unit 44 stores an environmental score as a parameter indicating the level of influence of attack, if any, on each of one or more systems included in the object system 20.

In the present embodiment, for each of first and second systems, the environmental score storage unit 44 stores an environmental score for each of the vulnerabilities registered in advance. For example, the environmental score is a CVSS environmental score.

Figure 8:
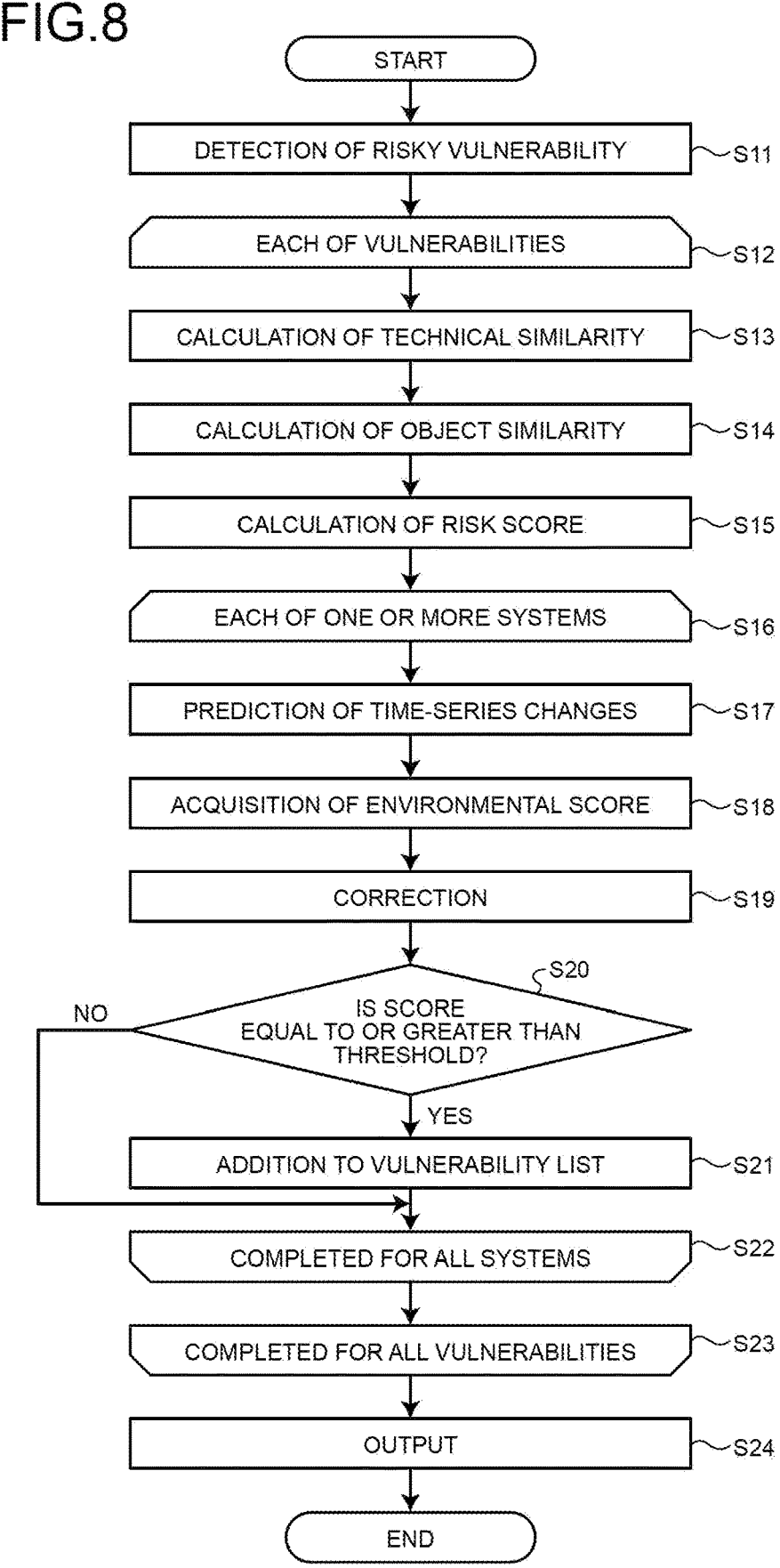
FIG. 8 is a flowchart illustrating the flow of processing by the selection device according to the first embodiment.

FIG. 8 is a flowchart illustrating the flow of processing by the selection device 24 according to the first embodiment.

The selection device 24 starts processing from S11 every time the selection device 24 acquires information on vulnerabilities from a server device or the like that provides information on security, for example.

First, at S11, based on the acquired information on vulnerabilities, the selection device 24 detects a vulnerability having the possibility of becoming the cause of attack on the object system 20, as a risky vulnerability. Note that, if no vulnerability having the possibility of becoming the cause of attack is detected, the selection device 24 terminates the present flow.

Subsequently, at S12, the selection device 24 executes processing from S13 to S22 for each of the vulnerabilities registered in advance (loop processing between S12 and S23). Note that the selection device 24 does not execute the loop processing between S12 and S23 for a vulnerability identical to the risky vulnerability out of the vulnerabilities registered in advance.

At S13, for a vulnerability targeted for the loop processing, the selection device 24 calculates a technical similarity. For example, the selection device 24 refers to the vulnerability technical information and the technical score information and thereby calculates a technical similarity by the calculation method described with reference to FIG. 4.

Subsequently, at S14, for the vulnerability targeted for the loop processing, the selection device 24 calculates an object similarity. For example, the selection device 24 refers to the vulnerable object information and object score information and thereby calculates an object similarity by using the calculation method described with reference to FIG. 6.

Subsequently, at S15, the selection device 24 calculates a risk score indicating the level of the risk of attack on the vulnerability targeted for the loop processing in the object system 20, based on the calculated technical similarity and the calculated object similarity.

For example, a calculated technical similarity is denoted as A, a calculated object similarity is denoted as B, and a risk score is denoted as RISK. In this case, the selection device 24 may calculate a risk score by adding a technical similarity and an object similarity, as illustrated in Equation (1).

$$RISK = A + B \tag{1}$$

Alternatively, as illustrated in Equation (2), the selection device 24 may also calculate a risk score by multiplying a technical similarity by an object similarity.

$$RISK = A \times B \tag{2}$$

Alternatively, as illustrated in Equation (3), when either the technical similarity or the object similarity is greater than a preset threshold, the selection device 24 may determine that the risk score is 1, meanwhile, when neither the technical similarity nor the object similarity is greater than the preset threshold, the selection device 24 may determine that the risk score is 0.

$$\text{IF } (A > \text{THD\_A OR } B > \text{THD\_B}) \tag{3}$$
$$\text{THEN RISK} = 1 \text{ ELSE RISK} = 0$$

In Equation (3), THD_A represents a threshold for technical similarity. THD_B represents a threshold for object similarity.

As illustrated in Equation (4), the selection device 24 may also calculate a risk score by multiplying a technical similarity and an object similarity by respective weight coefficients and adding the resultants to each other.

$$RISK = \alpha \times A + \beta \times B \quad (4)$$

In Equation (4), α represents a weight coefficient for technical similarity. β represents a weight coefficient for object similarity.

Note that the selection device 24 may calculate a risk score not only by the above-described calculation methods, but also by other methods based on a technical similarity and an object similarity. The selection device 24 may calculate a risk score, based on a technical similarity only, or alternatively may calculate a risk score, based on an object similarity only.

Subsequently, the selection device 24 executes processing from S17 to S21 (loop processing between S16 and S22) for each of one or more systems included in the object system 20.

At S17, for the system targeted for the loop processing, the selection device 24 calculates the amount of change in the risk of attack on a vulnerability after an elapse of a set period from a specific time point to a prediction time point, by using the prediction model, to predict a time-series change. For example, the selection device 24 calculates the amount of change in the risk, for which the present time point is used as the specific time point and a point in time of next maintenance for providing a patch program to the system targeted for the loop processing is used as the prediction time point.

Subsequently, at S18, the selection device 24 acquires an environmental score for the system targeted for the loop processing in the vulnerability targeted for the loop processing.

Subsequently, at S19, the selection device 24 corrects the risk score for the system targeted for the loop processing in the vulnerability targeted for the loop processing, based on the calculated amount of change in the risk and the acquired environmental score.

For example, when the amount of change in the risk is R(n) and the environmental score is a CBSS environmental score, the selection device 24 calculates a corrected risk score, as illustrated in Equation (5).

$$\text{Corrected Risk Score} = RISK \times R(n) \times CVSS \text{ Environmental Score} \quad (5)$$

Thus, the selection device 24 can calculate a risk score, in consideration of the level of the influence of attack on a vulnerability targeted for the loop processing, the vulnerability being included in a system targeted for the loop processing, and the amount of change in the risk in a period from a specific time point to a prediction time point.

For example, as illustrated in FIG. 3 to FIG. 6, it is assumed that, when CVE-2021-yyyyy is a risky vulnerability, the risk score of CVE-2019-xxxxx is 4 (=2+2) and the risk score of CVE-2019-zzzzz is 7 (=6+1). Furthermore, as illustrated in FIG. 7, it is assumed that a CVSS environmental score of CVE-2019-xxxxx in the first system is 9.5 and a CVSS environmental score of CVE-2019-zzzzz is 8.8. Furthermore, it is assumed that the next maintenance for providing a patch program to the first system is to be performed 30 days later, and the amount of change in the risk in the first system after the elapse of 30 days (R(30)) is 1.1.

In this case, the selection device 24 calculates a corrected risk score of CVE-2019-xxxxx in the first system, as illustrated in Equation (6).

$$\text{Corrected Risk Score} = (2+2) \times 1.1 \times 9.5 = 41.8 \quad (6)$$

Furthermore, the selection device 24 calculates a corrected risk score of CVE-2019-zzzzz in the first system, as illustrated in Equation (7).

$$\text{Corrected Risk Score} = (6+1) \times 1.1 \times 8.8 = 67.76 \quad (7)$$

Subsequently, at S20, the selection device 24 determines whether or not the calculated corrected risk score is equal to or greater than a preset threshold. If the corrected risk score is equal to or greater than the threshold (Yes at S20), the selection device 24 proceeds with the processing to S21. At S21, the selection device 24 registers the vulnerability targeted for the loop processing in a vulnerability list (addition to the vulnerability list). In addition, the selection device 24 registers a set of the system targeted for the loop processing and the corrected risk score while causing the registered vulnerability to correspond thereto. If the corrected risk score is not greater than the threshold (No at S20), the selection device 24 skips the processing of S21.

When completing the processing of S17 to S21 for each of the one or more systems, the selection device 24 exits the loop processing between S16 and S22 and proceeds with the processing to S23.

When completing the processing of S13 to S22 for each of the vulnerabilities registered in advance, the selection device 24 exits the loop processing between S12 and S23 and proceeds with the processing to a process S24.

At S24, for each of the one or more systems, the selection device 24 determines a vulnerability included in the vulnerability list, as a target vulnerability to be dealt with. Subsequently, the selection device 24 outputs identification information for identifying the target vulnerability and information for identifying the system to the security management device 26. The selection device 24 may also output a risk score along with the identification information for identifying the target vulnerability and the information for identifying the system.

Note that, although the selection device 24 determines at S20 whether or not the corrected risk score is equal to or greater than the threshold, the selection device 24 may add all the vulnerabilities to the vulnerability list without the determination at S20. In this case, at the output stage at S24, the selection device 24 determines a vulnerability equal to or greater than the threshold, out of the vulnerabilities listed in the vulnerability list, as a target vulnerability.

When completing the processing of S24, the selection device 24 terminates the processing of this flow.

As described above, when a risky vulnerability with a high degree of risk is detected, the information processing system 10 according to the first embodiment can efficiently select a target vulnerability that is similar to the risky vulnerability and needs to be dealt with. Subsequently, the information processing system 10 takes a measure to apply a patch program to the target vulnerability. Thus, the information processing system 10 can take the measure in advance against other vulnerabilities similar to the risky vulnerability, which results in more efficient system operation.

For example, the information processing system 10 according to the first embodiment can select a vulnerability having an attack risk exceeding a threshold by the time of the next maintenance as a target vulnerability, and take a measure to apply a patch program. Thus, for example, in the case where the object system 20 is a computer system, such as an OT system, for which the timing of applying a patch program is limited and the number of applications of the patch program needs to be minimized, the information processing system 10 according to the first embodiment can reduce the number of applications of the patch program and also securely take a measure against attack. Thus, the information processing system 10 according to the first embodiment can efficiently operate the object system 20.

Second Embodiment

Next, an information processing system 10 according to a second embodiment will be described. Note that the information processing system 10 according to the second embodiment has approximately the same function and configuration as those in the first embodiment described with reference to FIG. 1 to FIG. 8. Therefore, in descriptions of the information processing system 10 according to the second embodiment, constituents having approximately the same functions and configurations as those in the first embodiment will be respectively given the same reference numerals and detailed descriptions thereof will be omitted, except descriptions of differences therebetween.

In the second embodiment, the information processing system 10 deals with vulnerabilities by taking a mitigation measure in addition to or instead of providing a patch program for a target vulnerability to an object system 20.

Figure 9:
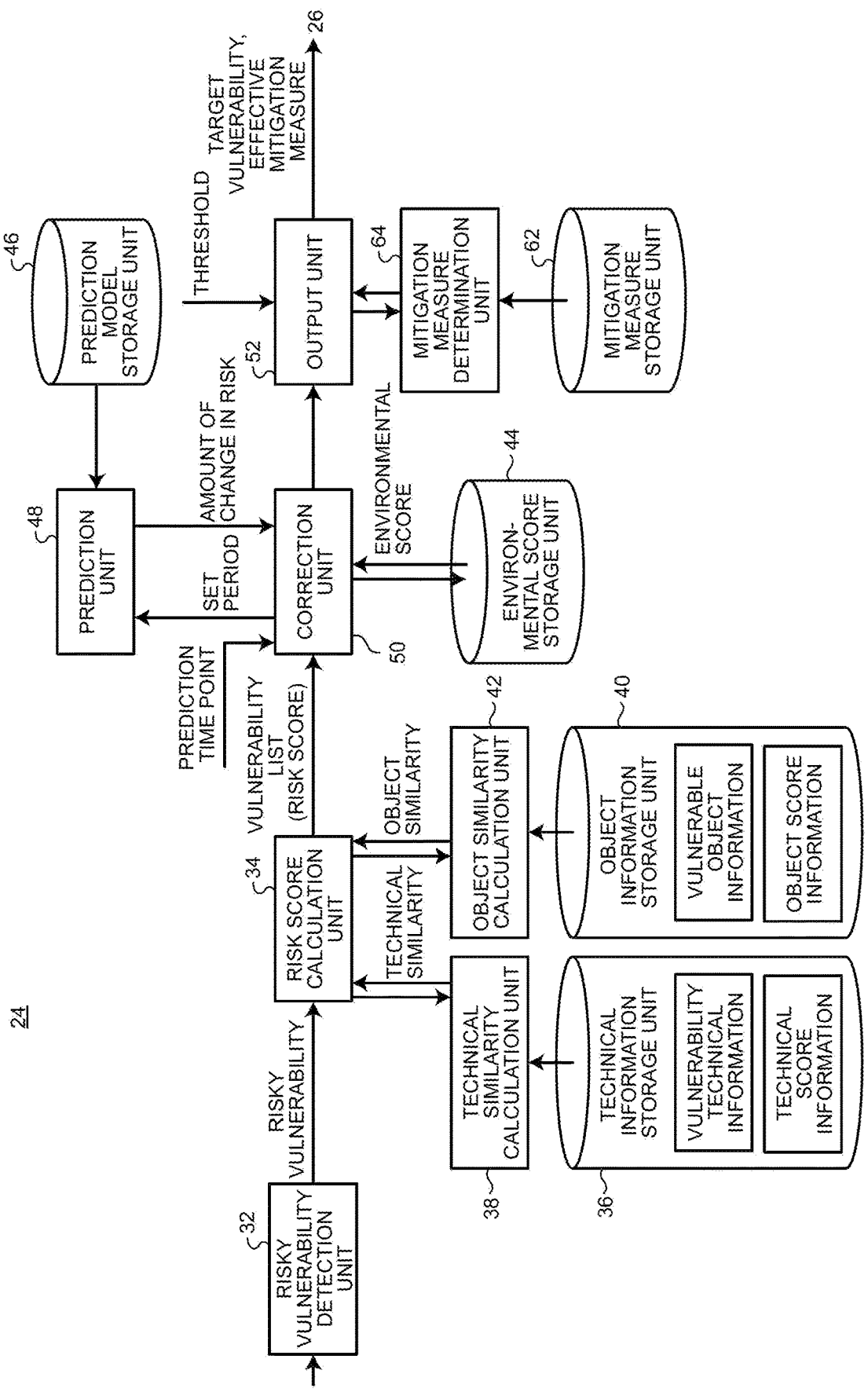
FIG. 9 is a diagram illustrating the configuration of a selection device according to a second embodiment.

FIG. 9 is a diagram illustrating the configuration of a selection device 24 according to the second embodiment. Compared to the selection device 24 according to the first embodiment, the selection device 24 according to the second embodiment further includes a mitigation measure storage unit 62 and a mitigation measure determination unit 64.

The mitigation measure storage unit 62 stores mitigation measure information. For each of a plurality of mitigation measures registered in advance, any one or more items of a vulnerability for which the measure is effective, the type of the vulnerability for which the measure is effective, the characteristic of the vulnerability, and the feature of the source or binary code of the vulnerability is registered in advance in the mitigation measure information.

Each of the mitigation measures is a method for mitigating the influence of a vulnerability by using a method other than dealing with the vulnerability by a patch program. One of the mitigation measures is, for example, installation of a firewall. The firewall is a device or a computer program configured to detect and prohibit unauthorized intrusion from the outside and unauthorized transmission to the outside via a network. Another one of the mitigation measures is installation of an IDS. The IDS is a device or a computer program configured to detect unauthorized intrusion from the outside via a network. Another one of the mitigation measures is, for example, introduction of an anti-virus program. The anti-virus program is a computer program configured to prohibit a virus program from entering a system and detect and eliminate a virus program that already entered a system. Note that the mitigation measures may include other methods instead of or in addition to the installation of the firewall, the installation of the IDS, and the introduction of the anti-virus program.

The mitigation measure determination unit 64 determines one or more effective mitigation measures effective for a target vulnerability determined by the output unit 52, out of the mitigation measures registered in the mitigation measure information. For example, out of the mitigation measures, the mitigation measure determination unit 64 determines one or more mitigation measures with any one or more items of the registered type, characteristic, and feature, for which the measure is effective, being the same as those of the target vulnerability, as one or more effective mitigation measures. Thus, the mitigation measure determination unit 64 can determine a mitigation measure that mitigates the influence of the target vulnerability, as an effective mitigation measure.

Subsequently, the output unit 52 outputs the target vulnerability and also outputs the one or more effective mitigation measures determined against the target vulnerability.

Furthermore, the mitigation measure determination unit 64 may determine an optimal effective mitigation measure out of the one or more effective mitigation measures, based on a preset policy. Subsequently, the output unit 52 may output the target vulnerability and also output the determined optimal effective mitigation measure.

For example, in the case of outputting a plurality of target vulnerabilities, the mitigation measure determination unit 64 may determine an optimal effective mitigation measure, based on a policy of minimizing the number of overall optimal effective mitigation measures. Alternatively, in the case of outputting one or more target vulnerabilities, the mitigation measure determination unit 64 may determine an optimal effective mitigation measure, based on a policy of limiting to the predetermined cost or lower. Alternatively, the mitigation measure determination unit 64 may determine an optimal effective mitigation measure, based on a policy of satisfying a condition defined in the object system 20. Alternatively, the mitigation measure determination unit 64 may determine an optimal effective mitigation measure, based on a policy of applying a plurality of effective mitigation measures to a single target vulnerability.

FIG. 10 is a diagram illustrating an example of mitigation measure information stored in the mitigation measure storage unit 62.

In the example in FIG. 10, in the mitigation measure information, a plurality of mitigation measures, namely, installation of a firewall, installation of an IDS, and introduction of an anti-virus program are registered. Furthermore, for each of the installation of the firewall, the installation of the IDS, and the introduction of the anti-virus program, a vulnerability for which the measure is effective (for example, effective CVE), the type of the vulnerability for which the measure is effective (for example, effective CWE), the characteristic of the vulnerability for which the measure is effective (for example, effective CVSS vector), and the feature of the source or binary code of the vulnerability for which the measure is effective (for example, effective vulnerability code feature) are registered in the mitigation measure information.

For example, the mitigation measure information illustrated in FIG. 10 states, in an item of effective vulnerability identification information, that installation of an IDS is effective for CVE-2019-xxxxx. Furthermore, the mitigation measure information illustrated in FIG. 10 states, in an item of effective vulnerability characteristic (effective CVSS vector), that installation of a firewall is effective for Vector B.

For example, the vulnerability characteristic (for example, CVSS vector) of CVE-2019-xxxxx is Vector B. Hence, in the case where the mitigation measure information illustrated in FIG. 10 is stored, when CVE-2019-xxxxx is a target vulnerability, the mitigation measure determination unit 64 determines installation of the firewall and installation of the IDS as effective mitigation measures.

The mitigation measure information illustrated in FIG. 10 also states, in the item of effective vulnerability identification information, that installation of the IDS is effective for CVE-2019-zzzzz. Hence, in the case where the mitigation measure information illustrated in FIG. 10 is stored, when CVE-2019-zzzzz is a target vulnerability, the mitigation measure determination unit 64 determines installation of the IDS as an effective mitigation measure. It is assumed that two vulnerabilities, namely, CVE-2019-xxxxx and CVE-2019-zzzzz, are determined as target vulnerabilities. Furthermore, it is assumed that effective mitigation measures for CVE-2019-xxxxx are installation of the firewall and installation of the IDS. Furthermore, it is assumed that an effective mitigation measure for CVE-2019-zzzzz is installation of the IDS.

Furthermore, it is assumed that, in the mitigation measure determination unit 64, a policy of minimizing the number of overall optimal effective mitigation measures when a plurality of target vulnerabilities is output is predetermined. In this case, the mitigation measure determination unit 64 determines the installation of the IDS, which is an effective mitigation measure for both CVE-2019-xxxxx and CVE-2019-zzzzz, as an optimal effective mitigation measure. Thus, the mitigation measure determination unit 64 can minimize the number of optimal effective mitigation measures to be determined.

Note that the mitigation measure determination unit 64 may determine an optimal effective mitigation measure, based on other policies. For example, the mitigation measure determination unit 64 may determine an optimal effective mitigation measure, based on a policy of limiting to the predetermined cost or lower in the case of outputting a plurality of target vulnerabilities, a policy of satisfying a condition defined in the object system 20, or a policy of applying a plurality of effective mitigation measures to a single target vulnerability.

Figure 11:
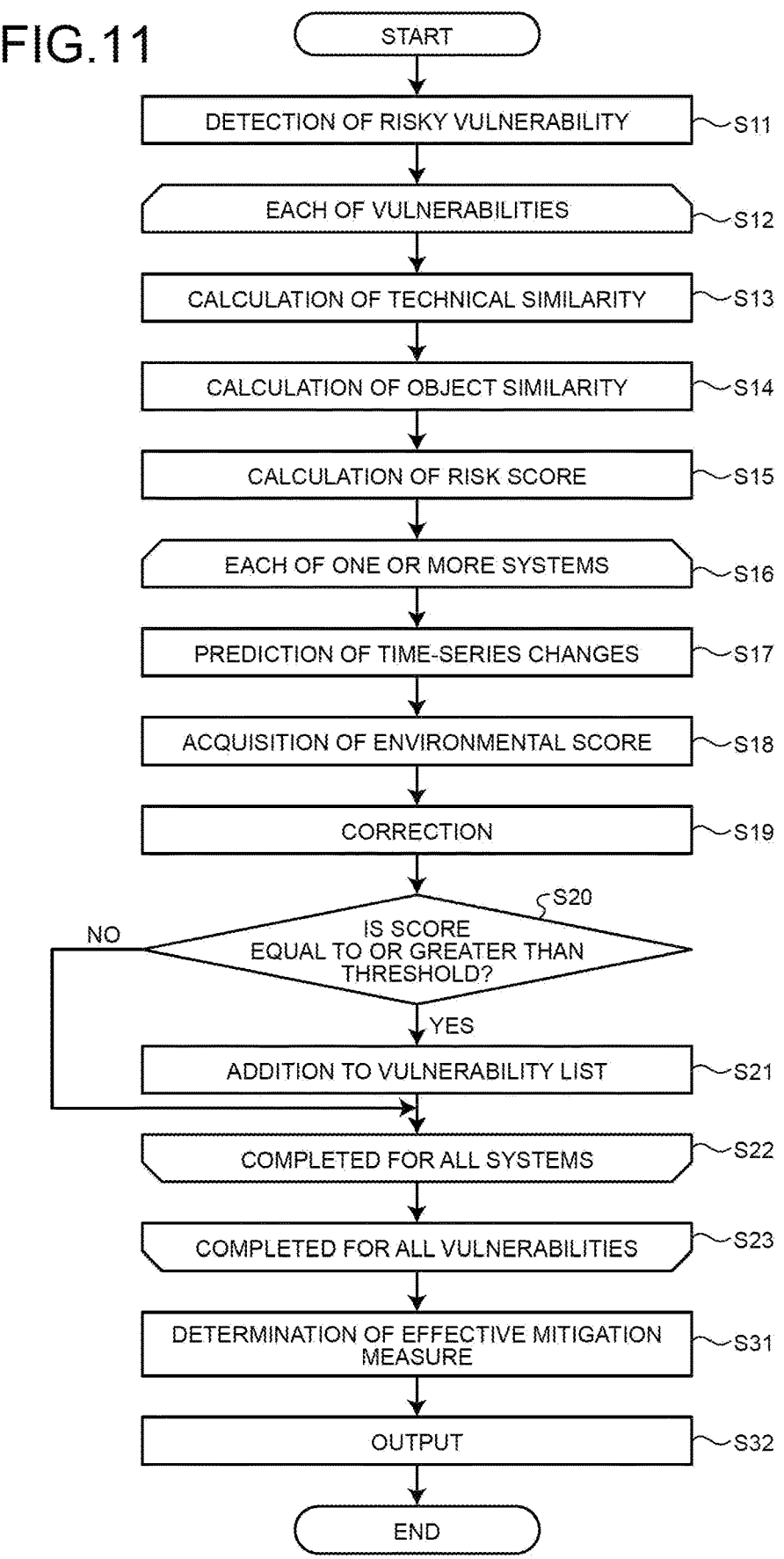
FIG. 11 is a flowchart illustrating the flow of processing by the selection device according to the second embodiment.

FIG. 11 is a flowchart illustrating the flow of processing by the selection device 24 according to the second embodiment.

The selection device 24 according to the second embodiment executes the processing in accordance with the flow illustrated in FIG. 11. At S11 to S23, the selection device 24 according to the second embodiment executes the same processing as that in the first embodiment illustrated in FIG. 8. After loop processing between S12 and S23 is completed, the selection device 24 according to the second embodiment proceeds with the processing to S31.

At S31, the selection device 24 determines one or more effective mitigation measures effective for a target vulnerability listed in the vulnerability list.

Furthermore, the selection device 24 may determine an optimal effective mitigation measure for one or more target vulnerabilities, based on a preset policy.

The selection device 24 executes processing of S32 subsequent to S31. At S32, the selection device 24 outputs the one or more effective mitigation measures for the target vulnerability. In addition, for each of the one or more effective mitigation measures, the selection device 24 outputs one or more effective mitigation measures. In addition, the selection device 24 may output an optimal effective mitigation measure determined for the one or more target vulnerabilities.

Then, when completing the processing of S32, the selection device 24 terminates the processing of the present flow.

To achieve a sufficient effect in reducing the influence of a vulnerability, an administrator of the object system 20 sometimes desires to apply not a patch program but a mitigation measure to the object system 20. For example, in the case where an attack source is limited to an external network, the administrator sometimes desires to install a firewall, instead of applying a patch program. The information processing system 10 according to the second embodiment can provide an effective mitigation measure that is a method for dealing with a target vulnerability other than application of a patch program. Thus, the information processing system 10 according to the second embodiment can provide the administrator of the object system 20 or the like with many options about how to deal with the target vulnerability. Furthermore, the information processing system 10 according to the second embodiment can also provide the administrator or the like with an optimal effective mitigation measure, based on the preset policy. Thus, the information processing system 10 according to the second embodiment allow the administrator to easily select the optimal effective mitigation measure from many effective mitigation measures.

Hardware Configuration of Information Processing Device

Figure 12:
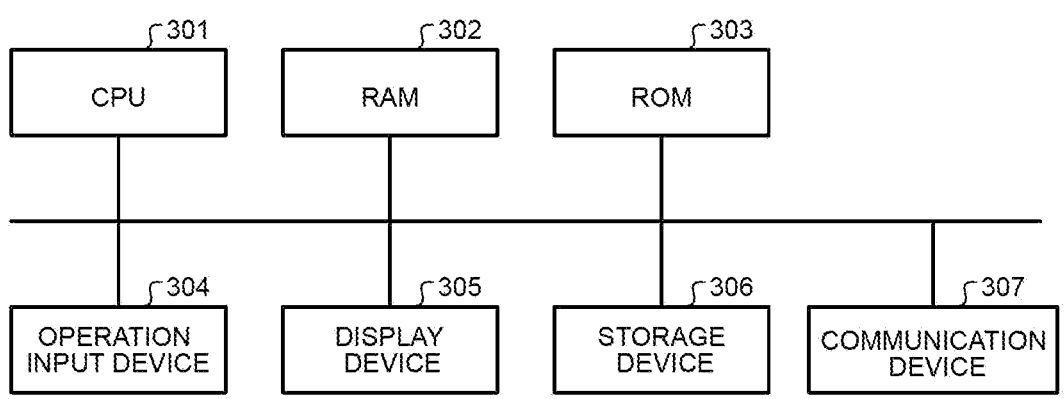
FIG. 12 is a diagram illustrating an example of the hardware configuration of the selection devices of the embodiments.

FIG. 12 is a diagram illustrating an example of the hardware configuration of the selection device 24 according to each of the embodiments.

The selection device 24 is implemented by a computer (an information processing device) having a hardware configuration illustrated in FIG. 12, for example. The selection device 24 includes a central processing unit (CPU) 301, a random access memory (RAM) 302, a read only memory (ROM) 303, an operation input device 304, a display device 305, a storage device 306, and a communication device 307. These components are connected through a bus.

The CPU 301 is a processor that executes arithmetic processing, control processing, and the like in accordance with a computer program. The CPU 301 uses a predetermined area in the RAM 302 as a work area to execute various types of processing in cooperation with a computer program stored in the ROM 303, the storage device 306, and the like.

The RAM 302 is a memory such as a synchronous dynamic random access memory (SDRAM). The RAM 302 functions as a work area for the CPU 301. The ROM 303 is a non-rewritable memory for computer programs and various types of information.

The operation input device 304 is an input device such as a mouse or a keyboard. The operation input device 304 accepts information inputted by the user as an instruction signal and outputs the instruction signal to the CPU 301.

The display device 305 is a display device such as a liquid crystal display (LCD). The display device 305 displays various types of information, based on a display signal from the CPU 301.

The storage device 306 is a device that writes and reads data into and from, for example, a semiconductor storage medium such as a flash memory or a magnetically or optically recordable storage medium. The storage device 306 writes and reads data into and from a storage medium under the control of the CPU 301. The communication device 307 communicates with an external device through a network under the control of the CPU 301.

A computer program executed by a computer has a module configuration including a risky vulnerability detection module, a risk score calculation module, a technical similarity calculation module, an object similarity calculation module, a prediction module, a correction module, and an output module. The computer program may further include a mitigation measure determination module.

This computer program is loaded into the RAM 302 by the CPU 301 (processor) and executed to allow the computer to function as the risky vulnerability detection unit 32, the risk score calculation unit 34, the technical similarity calculation unit 38, the object similarity calculation unit 42, the prediction unit 48, the correction unit 50, and the output unit 52. Furthermore, this computer program may cause the computer to function as the mitigation measure determination unit 64. Furthermore, this computer program causes the RAM 302, the ROM 303, or the storage device 306 to function as the technical information storage unit 36, the object information storage unit 40, the environmental score storage unit 44, and the prediction model storage unit 46. Furthermore, this computer program may cause the RAM 302, the ROM 303 or the storage device 306 to function as the mitigation measure storage unit 62. Note that some or all of the risky vulnerability detection unit 32, the risk score calculation unit 34, the technical similarity calculation unit 38, the object similarity calculation unit 42, the prediction unit 48, the correction unit 50, the output unit 52, and the mitigation measure determination unit 64 may be implemented by hardware circuitry.

The computer program to be executed by the computer is recorded in a computer installable or executable file format on a computer-readable recording medium, such as a CD-ROM, a flexible disk, a CD-R, or a digital versatile disc (DVD).

This computer program may be provided by being stored on a computer connected to a network such as the Internet and downloaded via a network. Alternatively, this computer program may be provided or distributed via a network such as the Internet. Alternatively, the computer program to be executed by the selection device 24 may be provided by being incorporated in advance into the ROM 303 or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Note

The above-described embodiments can be summarized in the following technical proposals.

Example 1

An information processing device according to an embodiment includes one or more hardware processors configured to function as a risky vulnerability detection unit, a technical similarity calculation unit, a risk score calculation unit, and an output unit. The risky vulnerability detection unit is configured to detect, as a risky vulnerability, a vulnerability having a possibility of becoming a cause of attack on an object system configured to execute information processing. The technical similarity calculation unit is configured to calculate a technical similarity representing a technical similarity to the risky vulnerability, for each of a plurality of vulnerabilities registered in advance. The risk score calculation unit is configured to calculate, for each of the vulnerabilities, a risk score representing a level of a risk of attack on a corresponding vulnerability in the object system, based on the technical similarity. The output unit is configured to determine at least one of the vulnerabilities as a target vulnerability to be dealt with, based on the risk score for each of the vulnerabilities, and output identification information for identifying the target vulnerability.

Example 2

In the information processing device according to example 1, out of the vulnerabilities, the output unit determines a vulnerability for which the risk score is equal to or greater than a preset threshold, as the target vulnerability.

Example 3

In the information processing device according to any one of examples 1 to 2, for each of the vulnerabilities, the technical similarity calculation unit calculates a similarity to the risky vulnerability in any one or more items of a type of vulnerability, a characteristic of vulnerability, and a feature of a source or binary code of vulnerability, as the technical similarity.

Example 4

In the information processing device according to example 3, a score is assigned in advance to each of the type, the characteristic, and the feature. For each of the vulnerabilities, the technical similarity calculation unit calculates, as the technical similarity, a value obtained by adding scores of items in which each of the vulnerabilities is identical to the risky vulnerability.

Example 5

In the information processing device according to any one of examples 1 to 4, the one or more hardware processors are configured to further function as an object similarity calculation unit configured to calculate an object similarity to the risky vulnerability for each of the vulnerabilities registered in advance. The object similarity represents a similarity of an object having or causing vulnerability. For each of the vulnerabilities, the risk score calculation unit calculates the risk score, based on the technical similarity and the object similarity.

Example 6

In the information processing device according to example 5, for each of the vulnerabilities, the object similarity calculation unit calculates, as the object similarity, a similarity to the risky vulnerability in any one or more items of object software/hardware representing software or hardware having vulnerability, a software type representing a type of software having vulnerability, and an object hardware type representing a type of hardware having vulnerability caused by executing software having vulnerability.

Example 7

In the information processing device according to example 6, a score is assigned in advance to each of the object software/hardware, the software type, and the object hardware type. For each of the vulnerabilities, the object similarity calculation unit calculates, as the object similarity, a value obtained by adding scores of items in which each of the vulnerabilities is identical to the risky vulnerability.

Example 8

In the information processing device according to any one of examples 1 to 7, the one or more hardware processors are configured to further function as a correction unit configured to correct the risk score for each of the vulnerabilities, based on an environmental score representing a level of influence of attack on the object system.

Example 9

In the information processing device according to example 8, the one or more hardware processors are configured to further function as a prediction unit configured to predict an amount of change in risk of attack on vulnerability during a set period from a specific time point to a prediction time point. For each of the vulnerabilities, the correction unit corrects the risk score, based on the amount of change in the risk.

Example 10

In the information processing device according to example 9, the correction unit uses, as the set period, a period from the specific time point to a point in time when next maintenance is performed for the object system.

Example 11

In the information processing device according to any one of examples 1 to 11, the one or more hardware processors are configured to further function as a mitigation measure determination unit configured to determine one or more effective mitigation measures effective for the target vulnerability, out of a plurality of mitigation measures registered in advance to mitigate an influence of vulnerability by a method other than dealing with vulnerability by using a patch program. The output unit outputs the one or more effective mitigation measures determined for the target vulnerability.

Example 12

In the information processing device according to example 11, for each of the mitigation measures, any one or more items of a vulnerability for which a measure is effective, a type of the vulnerability for which the measure is effective, a characteristic of the vulnerability for which the measure is effective, and a feature of a source or binary code of the vulnerability for which the measure is effective are registered in advance. Out of the mitigation measures, the mitigation measure determination unit determines, as the one or more effective mitigation measures, any one or more mitigation measures that are identical to the target vulnerability in any one or more registered items of the type, the characteristic, and the feature of the source or binary code of the vulnerability for which the measure is effective.

Example 13

In the information processing device according to example 12, the mitigation measure determination unit determines an optimal effective mitigation measure out of the one or more effective mitigation measures, based on a preset policy. The output unit outputs the optimal effective mitigation measure for the target vulnerability.

Example 14

In the information processing device according to example 13, the mitigation measure determination unit determines the optimal effective mitigation measure, based on any of: a policy of minimizing a number of the overall optimal effective mitigation measures when a plurality of the target vulnerabilities is outputted; a policy of limiting to a predetermined cost or lower when one or more of the target vulnerabilities is outputted; a policy of satisfying a condition defined in the object system; and a policy of applying a plurality of effective mitigation measures to a single target vulnerability.

Example 15

An information processing system according to embodiment includes an object system configured to execute information processing; a security management device configured to provide a patch program to the object system to correct a vulnerability in the object system; and the information processing device according to any one of examples 1 to 14.

Example 16

According to embodiment, an information processing method is executed by an information processing device. The information processing method implemented, by the information processing device, includes detecting a vulnerability having a possibility of becoming a cause of attack on an object system configured to execute information processing, as a risky vulnerability; calculating, for each of a plurality of vulnerabilities registered in advance, a technical similarity representing a technical similarity to the risky vulnerability; calculating, for each of the vulnerabilities, a risk score representing a level of a risk of attack on a corresponding vulnerability in the object system, based on the technical similarity; and determining at least one of the vulnerabilities as a target vulnerability to be dealt with, based on the risk score for each of the vulnerabilities, and outputting identification information for identifying the target vulnerability.

Example 17

According to embodiment, a computer program product having a non-transitory computer readable medium includes programmed instructions. When executed by a computer of an information processing device, the instructions cause the computer to function as a risky vulnerability detection unit, a technical similarity calculation unit, a risk score calculation unit, and an output unit. The risky vulnerability detection unit is configured to detect a vulnerability having a possibility of becoming a cause of attack on an object system configured to execute information processing, as a risky vulnerability. The technical similarity calculation unit is configured to calculate, for each of a plurality of vulnerabilities registered in advance, a technical similarity representing a technical similarity to the risky vulnerability. The risk score calculation unit is configured to calculate, for each of the vulnerabilities, a risk score representing a level of a risk of attack on a corresponding vulnerability in the object system, based on the technical similarity. The output unit is configured to determine at least one of the vulnerabilities as a target vulnerability to be dealt with, based on the risk score for each of the vulnerabilities, and output identification information for identifying the target vulnerability.

What is claimed is:

1. An information processing device, comprising:
one or more hardware processors configured to function as:
a risky vulnerability detection unit configured to detect, as a risky vulnerability, a vulnerability having a possibility of becoming a cause of attack on an object system configured to execute information processing;
a technical similarity calculation unit configured to calculate a technical similarity representing a similarity to the risky vulnerability technically, for each of a plurality of vulnerabilities registered in advance, the technical similarity being greater as the similarity to the risky vulnerability technically is higher;
a risk score calculation unit configured to calculate, for each of the vulnerabilities, a risk score representing a level of a risk of attack on a corresponding vulnerability in the object system, based on the technical similarity; and
an output unit configured to determine at least one of the vulnerabilities as a target vulnerability to be dealt with, based on the risk score for each of the vulnerabilities, and output identification information for identifying the target vulnerability, wherein
for each of the vulnerabilities, the technical similarity calculation unit calculates a similarity to the risky vulnerability in any one or more items of a type of vulnerability, a characteristic of vulnerability, and a feature of a source or binary code of vulnerability, as the technical similarity.

2. The information processing device according to claim 1, wherein
out of the vulnerabilities, the output unit determines a vulnerability for which the risk score is equal to or greater than a preset threshold, as the target vulnerability.

3. The information processing device according to claim 1, wherein
a score is assigned in advance to each of the type, the characteristic, and the feature, and,
for each of the vulnerabilities, the technical similarity calculation unit calculates, as the technical similarity, a value obtained by adding scores of items in which each of the vulnerabilities is identical to the risky vulnerability.

4. The information processing device according to claim 1, wherein the one or more hardware processors are configured to further function as:
an object similarity calculation unit configured to calculate an object similarity to the risky vulnerability for each of the vulnerabilities registered in advance, the object similarity representing a similarity of an object having or causing vulnerability, wherein
for each of the vulnerabilities, the risk score calculation unit calculates the risk score, based on the technical similarity and the object similarity.

5. The information processing device according to claim 4, wherein
for each of the vulnerabilities, the object similarity calculation unit calculates, as the object similarity, a similarity to the risky vulnerability in any one or more items of object software/hardware representing software or hardware having vulnerability, a software type representing a type of software having vulnerability, and an object hardware type representing a type of hardware having vulnerability caused by executing software having vulnerability.

6. The information processing device according to claim 5, wherein
a score is assigned in advance to each of the object software/hardware, the software type, and the object hardware type, and,
for each of the vulnerabilities, the object similarity calculation unit calculates, as the object similarity, a value obtained by adding scores of items in which each of the vulnerabilities is identical to the risky vulnerability.

7. The information processing device according to claim 1, wherein
the one or more hardware processors are configured to further function as a correction unit configured to correct the risk score for each of the vulnerabilities, based on an environmental score representing a level of influence of attack on the object system.

8. The information processing device according to claim 7, wherein
the one or more hardware processors are configured to further function as:
a prediction unit configured to predict an amount of change in risk of attack on vulnerability during a set period from a specific time point to a prediction time point, wherein
for each of the vulnerabilities, the correction unit corrects the risk score, based on the amount of change in the risk.

9. The information processing device according to claim 8, wherein
the correction unit uses, as the set period, a period from the specific time point to a point in time when next maintenance is performed for the object system.

10. The information processing device according to claim 1, wherein
the one or more hardware processors are configured to further function as:
a mitigation measure determination unit configured to determine one or more effective mitigation measures effective for the target vulnerability, out of a plurality of mitigation measures registered in advance to mitigate an influence of vulnerability by a method other than dealing with vulnerability by using a patch program, wherein
the output unit outputs the one or more effective mitigation measures determined for the target vulnerability.

11. The information processing device according to claim 10, wherein,
for each of the mitigation measures, any one or more items of a vulnerability for which a measure is effective, a type of the vulnerability for which the measure is effective, a characteristic of the vulnerability for which the measure is effective, and a feature of a source or binary code of the vulnerability for which the measure is effective are registered in advance, and out of the mitigation measures, the mitigation measure determination unit determines, as the one or more effective mitigation measures, any one or more mitigation measures that are identical to the target vulnerability in any one or more registered items of the type, the characteristic, and the feature of the source or binary code of the vulnerability for which the measure is effective.

12. The information processing device according to claim 11, wherein the mitigation measure determination unit determines an optimal effective mitigation measure out of the one or more effective mitigation measures, based on a preset policy, and the output unit outputs the optimal effective mitigation measure for the target vulnerability.

13. The information processing device according to claim 12, wherein the mitigation measure determination unit determines the optimal effective mitigation measure, based on any of:

a policy of minimizing a number of the overall optimal effective mitigation measures when a plurality of the target vulnerabilities is outputted;

a policy of limiting to a predetermined cost or lower when one or more of the target vulnerabilities is outputted;

a policy of satisfying a condition defined in the object system; and a policy of applying a plurality of effective mitigation measures to a single target vulnerability.

14. An information processing system comprising:

an object system configured to execute information processing;

a security management device configured to provide a patch program to the object system to correct a vulnerability in the object system; and the information processing device according to claim 1.

15. An information processing method to be executed by an information processing device, the information processing method comprising:

by the information processing device, detecting a vulnerability having a possibility of becoming a cause of attack on an object system configured to execute information processing, as a risky vulnerability;

calculating, for each of a plurality of vulnerabilities registered in advance, a technical similarity representing a similarity to the risky vulnerability technically, the technical similarly being greater as the similarity to the risky vulnerability is technically higher;

calculating, for each of the vulnerabilities, a risk score representing a level of a risk of attack on a corresponding vulnerability in the object system, based on the technical similarity; and determining at least one of the vulnerabilities as a target vulnerability to be dealt with, based on the risk score for each of the vulnerabilities, and outputting identification information for identifying the target vulnerability, wherein for each of the vulnerabilities, calculating the technical similarity includes calculating a similarity to the risky vulnerability in any one or more items of a type of vulnerability, a characteristic of vulnerability, and a feature of a source or binary code of vulnerability, as the technical similarity.

16. A computer program product having a non-transitory computer readable medium including programmed instructions, wherein the instructions, when executed by a computer of an information processing device, cause the computer to function as:

a risky vulnerability detection unit configured to detect a vulnerability having a possibility of becoming a cause of attack on an object system configured to execute information processing, as a risky vulnerability;

a technical similarity calculation unit configured to calculate, for each of a plurality of vulnerabilities registered in advance, a similarity representing a technical similarity to the risky vulnerability, the technical similarity being greater as the similarity to the risky vulnerability technically is higher;

a risk score calculation unit configured to calculate, for each of the vulnerabilities, a risk score representing a level of a risk of attack on a corresponding vulnerability in the object system, based on the technical similarity; and an output unit configured to determine at least one of the vulnerabilities as a target vulnerability to be dealt with, based on the risk score for each of the vulnerabilities, and output identification information for identifying the target vulnerability, wherein for each of the vulnerabilities, the technical similarity calculation unit calculates a similarity to the risky vulnerability in any one or more items of a type of vulnerability, a characteristic of vulnerability, and a feature of a source or binary code of vulnerability as the technical similarity.

* * * * *